(12) United States Patent
Mallory (10) Patent No.: US 6,714,023 B2
(45) Date of Patent: Mar. 30, 2004

(54) METHOD FOR HIGH-ACCURACY NON-CONTACT CAPACITIVE DISPLACEMENT MEASUREMENT OF POORLY CONNECTED TARGETS

(75) Inventor: Roy E. Mallory, Bedford, MA (US)

(73) Assignee: ADE Technologies, Newton, MA (US)

( * ) Notice: Subject to any disclaimer, the term of this patent is extended or adjusted under 35 U.S.C. 154(b) by 0 days.

(21) Appl. No.: 10/353,889

(22) Filed: Jan. 29, 2003

(65) Prior Publication Data

US 2003/0141881 A1 Jul. 31, 2003

Related U.S. Application Data

(60) Provisional application No. 60/352,827, filed on Jan. 30, 2002.

(51) Int. Cl.[7] .............................................. G01R 27/26
(52) U.S. Cl. ....................................... 324/662; 324/688
(58) Field of Search ................................. 324/662, 663, 324/671, 686, 687, 688, 684, 669

(56) References Cited

U.S. PATENT DOCUMENTS 3,990,005 A    11/1976 Abbe et al. ............... 324/61 R
4,353,029 A *  10/1982 Abbe et al. ................. 324/236
4,910,453 A *   3/1990 Abbe et al. ................. 324/663
4,918,376 A *   4/1990 Poduje et al. ............... 324/663

* cited by examiner

Primary Examiner—Albert Decady
Assistant Examiner—James Kerveros
(74) Attorney, Agent, or Firm—Weingarten, Schurgin, Gagnebin & Lebovici LLP (57) ABSTRACT

A non-contact capacitive displacement measurement gage that provides high accuracy displacement measurements of well-connected targets and poorly-connected targets. The capacitive displacement measurement gage includes a capacitive probe, first and second amplifiers, and a signal generator. The capacitive probe includes a sensor electrode, a guard electrode, and a compensating electrode. The signal generator provides a predetermined voltage signal directly to the sensor electrode, to the guard electrode through the first amplifier having unity gain, and to the compensating electrode through the second amplifier having a predetermined transfer function. The second amplifier assures that substantially zero current is driven into the target element by the probe during gage operation, thereby allowing highly accurate displacement measurements of target elements having unknown or poorly controlled impedance.

29 Claims, 4 Drawing Sheets

PRIOR ART

FIG. 2b

PRIOR ART

METHOD FOR HIGH-ACCURACY NON-CONTACT CAPACITIVE DISPLACEMENT MEASUREMENT OF POORLY CONNECTED TARGETS

CROSS REFERENCE TO RELATED APPLICATIONS

This application claims priority of U.S. Provisional Patent Application No. 60/352,827 filed Jan. 30, 2002 entitled METHOD FOR HIGH-ACCURACY NON-CONTACT CAPACITIVE DISPLACEMENT MEASUREMENT OF POORLY CONNECTED TARGETS.

STATEMENT REGARDING FEDERALLY SPONSORED RESEARCH OR DEVELOPMENT

N/A

BACKGROUND OF THE INVENTION

The present invention relates generally to non-contact capacitive displacement measurement gages, and more specifically to non-contact capacitive displacement measurement gages capable of measuring displacements of target elements having unknown or uncontrollable impedance.

Non-contact capacitive displacement measurement gages are known that employ at least one capacitive probe to measure the displacement of a target element. In a conventional capacitive displacement measurement gage, a capacitance developed between a probe and a target element is converted by a signal processor into an output signal that is representative of the distance from the probe to the target. Specifically, the probe effectively forms one plate of a capacitor, and the target element effectively forms the other plate of the capacitor. To convert the capacitance between the probe and the target into an output signal representing the displacement of the target element, an electrical connection is normally required between the target and the probe and/or the signal processor. For example, this electrical connection may be made through a ground or "common" connection. Accordingly, the electrical connection may be made via a wire to ground, or by connecting the target and the probe and/or the signal processor to a common connection.

One drawback of the conventional capacitive displacement measurement gage is that it typically provides accurate displacement measurements only when there is a good electrical connection between the target and the probe and/or the signal processor, e.g., when the target element, the probe, and/or the signal processor are well-connected electrically to a common connection. For such a well-connected target, the relationship between the probe/target capacitance and the displacement of the target can be precisely determined. However, such good electrical connections often cannot be easily made between the target and the common connection, e.g., when the target is a semiconductor wafer disposed on a non-conductive surface. For such poorly-connected targets, it is difficult to determine a precise relationship between the probe/target capacitance and the target displacement because an impedance between the target element and the gage may be either unknown or poorly controlled.

One solution to the problem of making capacitive displacement measurements of poorly-connected targets is disclosed in U.S. Pat. No. 3,990,005 (the "'005 patent") issued Nov. 2, 1976 entitled CAPACITIVE THICKNESS GAUGING FOR UNGROUNDED ELEMENTS. The '005 patent discloses a capacitive dimension gage including two probes that are driven out-of-phase with each other and configured to remove the dependency on well-connected targets for achieving high accuracy displacement measurements. By providing drive currents having equal magnitude and opposite phase to the respective probes, the capacitive dimension gage prevents current from flowing through an impedance between the target element and the common connection, and therefore eliminates any adverse effect that this impedance would normally have on the operation of the gage. However, the capacitive dimension gage disclosed in the '005 patent also has drawbacks because it requires the use of multiple probes, which can significantly increase the cost and reliability of the gage.

It would therefore be desirable to have a highly accurate non-contact capacitive displacement measurement gage. Such a capacitive displacement gage would provide high accuracy displacement measurements of both well-connected and poorly-connected targets. It would also be desirable to have a capacitive displacement measurement gage that has increased reliability and a reduced cost of manufacture.

BRIEF SUMMARY OF THE INVENTION

In accordance with the present invention, a non-contact capacitive displacement measurement gage is disclosed that provides high accuracy displacement measurements of well-connected targets and poorly-connected targets. The presently disclosed capacitive displacement measurement gage employs at least one capacitive probe configured to drive substantially zero current into a target element, thereby nullifying any adverse effect an imperfect electrical connection between the target element and the gage may have on gage performance.

In one embodiment, the capacitive displacement measurement gage comprises at least one capacitive probe, at least one amplifier, and at least one signal generator. The capacitive probe includes a sensor electrode, a guard electrode, and a compensating electrode. The signal generator is configured to provide a predetermined voltage signal (1) directly to the sensor electrode, (2) to the guard electrode through a unity-gain amplifier, and (3) to the compensating electrode through a second amplifier having a predetermined transfer function. In the presently disclosed embodiment, the capacitive displacement gage is configurable to measure the displacement of at least one target element having an imperfect electrical connection to the gage, i.e., the electrical connection between the target element and the gage has an unknown or poorly controlled impedance. The second amplifier coupled between the signal generator and the compensating electrode is configured to assure that substantially zero current is driven into the target element by the probe during gage operation.

By providing a capacitive displacement measurement gage that employs a compensated capacitive probe, highly accurate displacement measurements of target elements can be made even if there is an unknown or poorly controlled impedance between the target element and the gage.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

U.S. Provisional Patent Application No. 60/352,827 filed Jan. 30, 2002 entitled METHOD FOR HIGH-ACCURACY NON-CONTACT CAPACITIVE DISPLACEMENT MEASUREMENT OF POORLY CONNECTED TARGETS is incorporated herein by reference.

A non-contact capacitive displacement measurement gage is provided that can be employed to make highly accurate displacement measurements of well-connected and poorly-connected target elements. The presently disclosed capacitive displacement gage includes at least one compensated capacitive probe that nullifies any adverse effects an imperfect electrical connection between the target element and the gage may have on gage performance.

Figure 1:
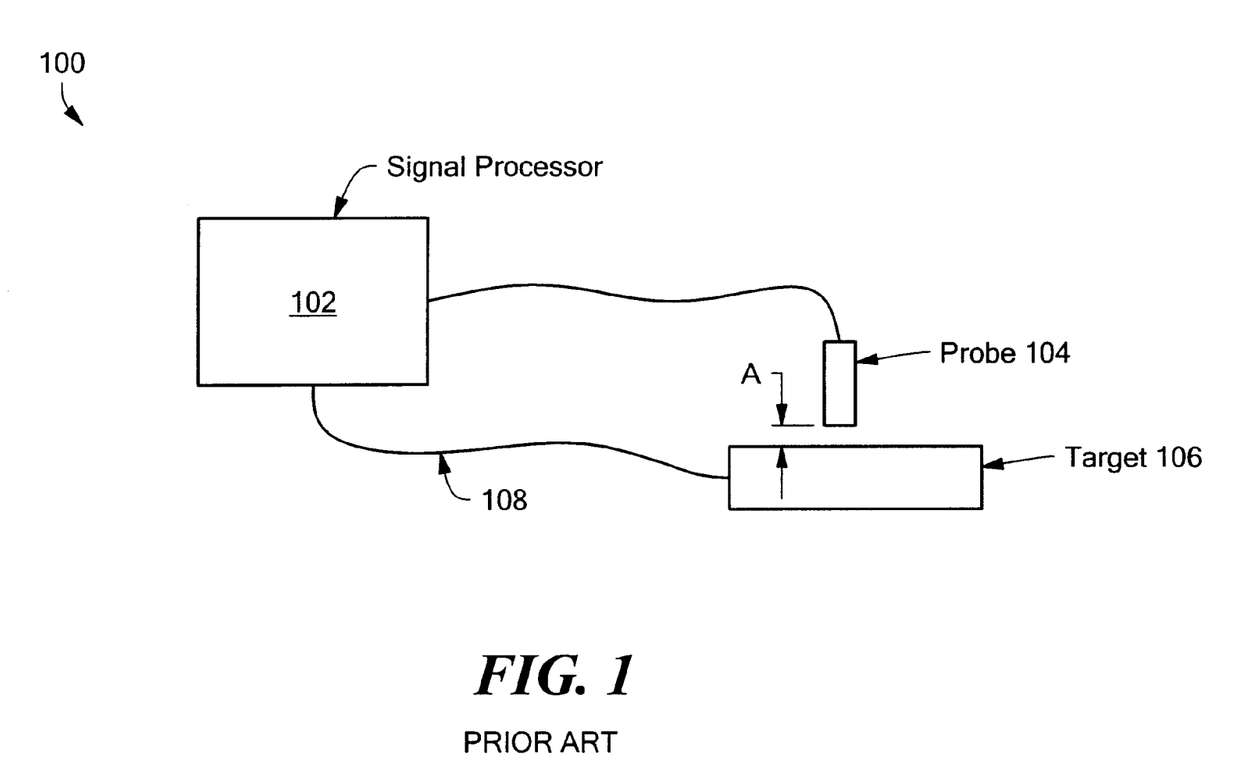
FIG. 1 is a block diagram of a conventional non-contact capacitive displacement measurement gage.

FIG. 1 depicts a conventional non-contact capacitive displacement measurement gage 100. As shown in FIG. 1, the capacitive displacement gage 100 includes a signal processor 102, and a capacitive probe 104 connected to the signal processor 102. In a typical mode of operation, the capacitive displacement gage 100 may be employed to measure a displacement A of a target element 106. To that end, the signal processor 102 is configured to convert a capacitance developed between the probe 104 and the target element 106 into an output signal representative of the distance A from the probe 104 to the target element 106.

Specifically, the probe 104 effectively forms one plate of a capacitor, and the target element 106 effectively forms the other plate of the capacitor. To develop the output signal representing the displacement A between the probe 104 and the target element 106, an electrical connection 108 is provided between the signal processor 102 and the target element 106. It is understood that a suitable electrical connection(s) may alternatively be provided between the target element 106 and the probe 104 and/or the signal processor 102. Accordingly, the electrical connection 108 may be made via a wire to ground, or by connecting the target element 106 and the probe 104 and/or the signal processor 102 to a "common" connection.

Figure 2A:
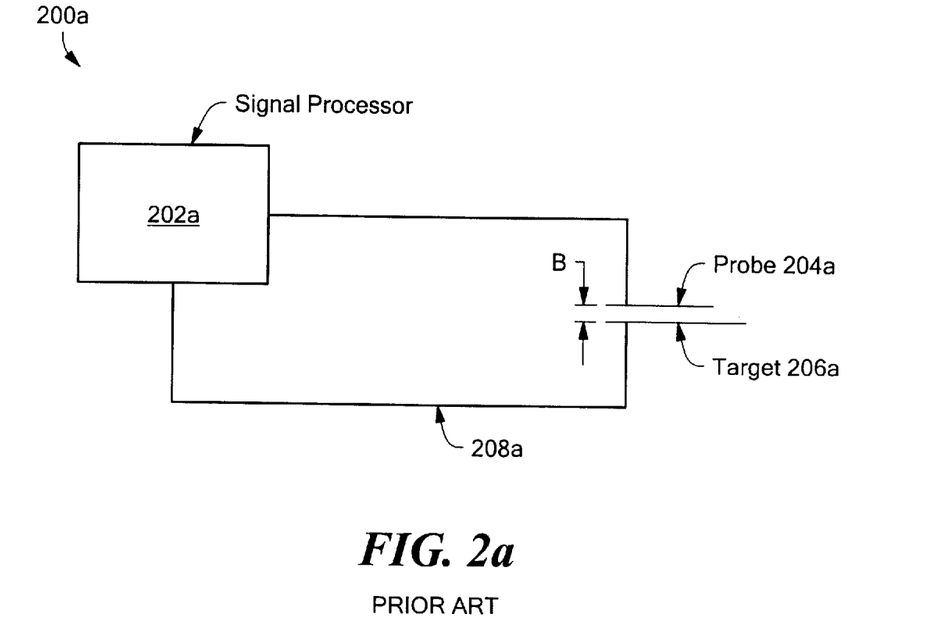
FIG. 2a is a schematic diagram of a conventional non-contact capacitive displacement measurement gage configured to measure the displacement of a well-connected target element.

FIG. 2a depicts a schematic diagram of a conventional non-contact capacitive displacement measurement gage 200a including a signal processor 202a and a capacitive probe 204a, in which a target element 206a is well-connected to the signal processor 202a through an electrical connection 208a. The phrase "well-connected element", as used herein, is defined as an electrical element that is connected to another electrical element via an electrical connection having a substantially zero impedance, a predetermined impedance, or a controllable impedance. For the well-connected target element 206a, the relationship between the probe/target capacitance and a displacement B of the target element 206a can be precisely determined by any suitable technique known to those of ordinary skill in this art. Accordingly, the well-connected target element 206a is connected to the signal processor 202a via the electrical connection 208a, which in this illustrative embodiment has a substantially zero impedance.

Figure 2B:
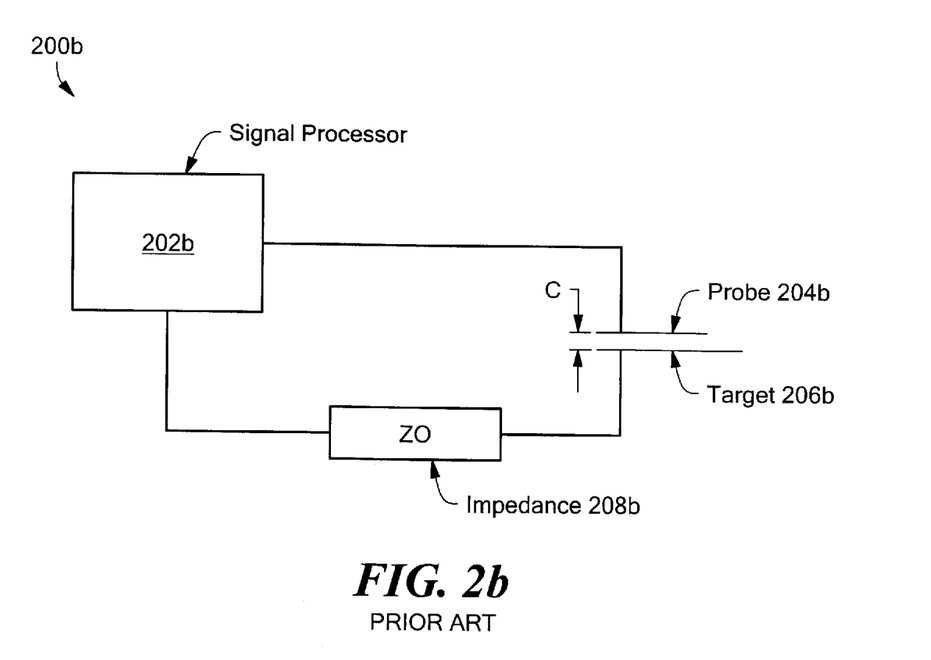
FIG. 2b is a schematic diagram of a conventional non-contact capacitive displacement measurement gage configured to measure the displacement of a poorly-connected target element.

FIG. 2b depicts a schematic diagram of a conventional non-contact capacitive displacement measurement gage 200b including a signal processor 202b and a capacitive probe 204b, in which a target element 206b is poorly-connected to the signal processor 202b through an electrical connection 208b. The phrase "poorly-connected element", as used herein, is defined as an electrical element that is connected to another electrical element via an electrical connection having an unknown or uncontrollable impedance. For the poorly-connected target element 206b, it is typically difficult to precisely determine a relationship between the probe/target capacitance and a displacement C of the target element 206b. Accordingly, the poorly-connected target element 206b is connected to the signal processor 202b via the electrical connection 208b, which has an unknown or uncontrollable impedance $Z_0$.

Figure 3:
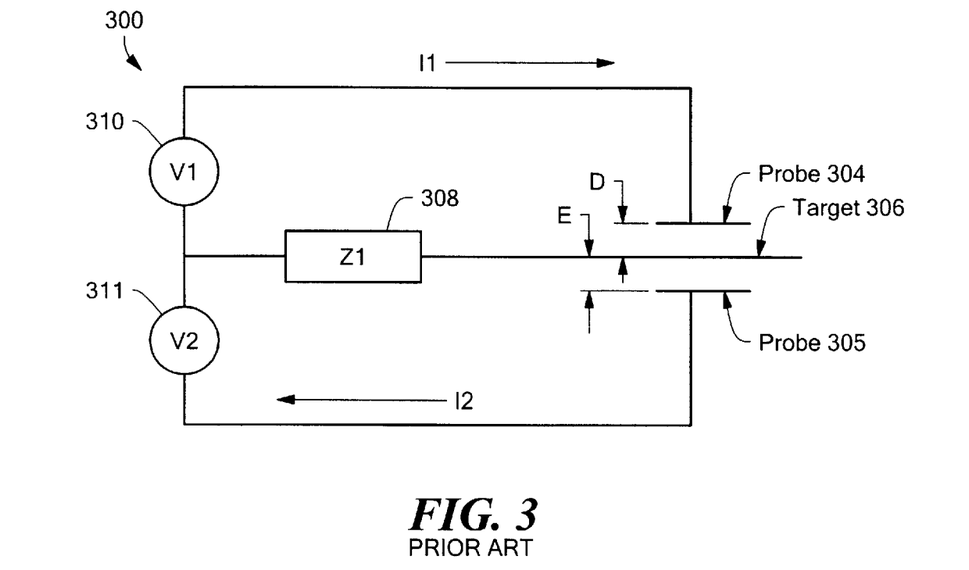
FIG. 3 is a schematic diagram of a conventional non-contact capacitive displacement measurement gage configured to nullify adverse effects of a poorly-connected target element on the displacement measurement.

FIG. 3 depicts a schematic diagram of a conventional non-contact capacitive displacement measurement gage 300 including signal generators 310–311 connected to capacitive probes 304–305, respectively, in which a target element 306 is poorly-connected to a common connection (not numbered) of the signal generators 310–311 through an electrical connection 308. Specifically, the poorly-connected target element 306 is connected to the signal generators 310–311 via the electrical connection 308, which has an unknown or uncontrollable impedance $Z_1$.

As shown in FIG. 3, the signal generator 310 is configured to provide a drive current $I_1$ to the probe 304, and the signal generator 311 is configured to provide a drive current $-I_2$ to the probe 305. In the event $i_1(t)=-i_2(t)$ (i.e., the drive currents $I_1$, $I_2$ have equal magnitude and opposite phase), substantially zero current flows through the electrical connection 308, and therefore the effect of the impedance $Z_1$ on the performance of the capacitive displacement gage 300 is essentially nil. Accordingly, because the effect of the impedance $Z_1$ is nullified, even though the target element 306 is poorly-connected to the signal generators 310–311, the relationship between the probe/target capacitance and displacements D and E of the target element 306 can be precisely determined by any suitable technique.

It is noted that such nullification of the effect of the impedance $Z_1$ on the performance of the capacitive displacement gage 300 may be extended to simultaneous displacement measurements using a plurality of probes (not shown) so long as the vector sum of currents developed through the probes cause substantially zero current to flow through the impedance $Z_1$. However, the capacitive displacement gage 300 requires the use of multiple capacitive probes 304–305, which can increase the cost and decrease the reliability of the gage 300.

Figure 4:
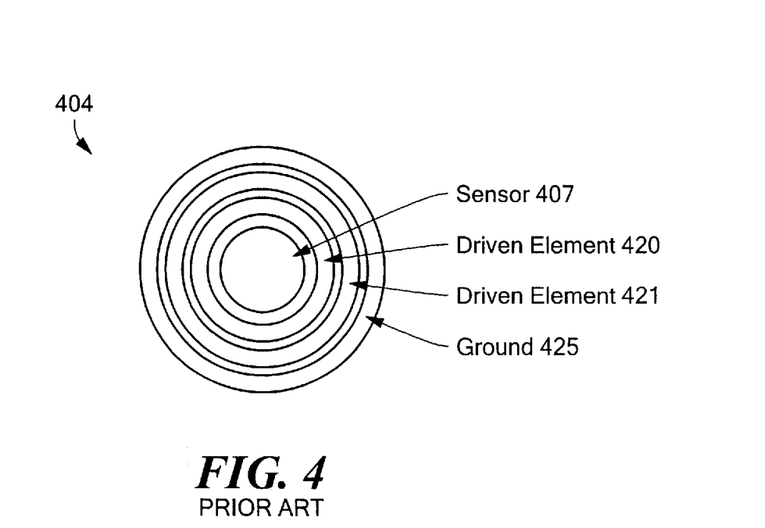
FIG. 4 is a plan view of a conventional capacitive probe that may be included in the conventional capacitive displacement gages of FIGS. 1–3.

FIG. 4 depicts a conventional capacitive probe 404, which may be included in the conventional capacitive displacement gages of FIGS. 1–3. As shown in FIG. 4, the capacitive probe 404 includes a sensor electrode 407, first and second drive electrodes 420–421, and a ground electrode 425. The sensor electrode 407 is configured to develop an output signal for measuring the displacement of a target element (not shown). The first drive electrode 420 is configured as a guard around the sensor electrode 407, and is typically driven at substantially the same voltage as the sensor electrode 407. The second drive electrode 421 is driven at any suitable voltage for achieving a desired transfer function of the probe's capacitance relative to its distance from the target element. The ground electrode 425 may be configured to modify the transfer function of the probe 404, or may merely comprise part of the probe's structure.

It is noted that the drive electrodes 420–421 and the ground electrode 425 may be omitted from the capacitive probe 404. Further, although the sensor electrode 407, the drive electrodes 420–421, and the ground electrode 425 are depicted in FIG. 4 as being substantially concentric circular elements, it is understood that the electrodes 407, 420–421, and 425 may have any suitable geometric shape.

The operation of the capacitive probe 404 will be better understood with reference to the following analysis. For clarity of analysis, it is assumed that the capacitive probe 404 includes only the sensor electrode 407 and the guard electrode 420.

Specifically, the amount of current "I" driven into a target element via any suitable driven element such as the probe 404 may be expressed as $$I = C(dV/dt). \quad (1)$$

Further, a corresponding equation for the steady-state current induced by a cyclical drive voltage may be expressed as $$I = sCV, \quad (2)$$

in which "s" is the complex frequency variable, and "I" and "V" are the root-mean-square (rms) values of the cyclical current and voltage, respectively.

The capacitance between the probe and the target element may be expressed as $$C = \delta_0 A/d, \quad (3)$$

in which "$\delta_0$" is the permittivity of free space, "A" is the area of the target element, and "d" is the distance from the probe to the target element.

Accordingly, the total current driven into the target element by the probe consisting of a guard electrode and a sensor electrode may be obtained by combining equations (2) and (3), i.e., $$I_t = sV_g\delta_0A_g/d_g + sV_s\delta_0A_s/d_s, \quad (4)$$

in which "$V_g$" is the guard voltage, "$A_g$" is the area of the guard electrode, "$d_g$" is the distance from the guard electrode to the target element, "$V_s$" is the sensor voltage, "$A_s$" is the area of the sensor electrode, and "$d_s$" is the distance from the sensor electrode to the target element. The conventional capacitive probe 404 is therefore configured to drive a total current $I_t$ into the target element, in which the total current $I_t$ is expressed as indicated in equation (4).

Figure 5:
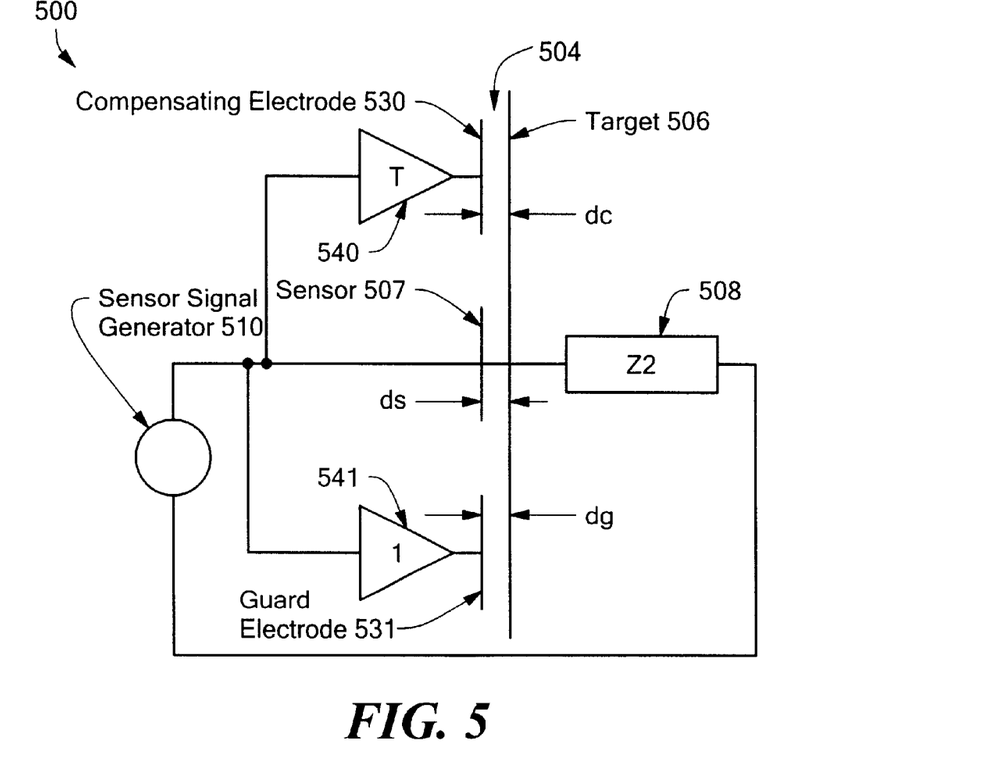
FIG. 5 is a schematic diagram of a non-contact capacitive displacement measurement gage according to the present invention.

FIG. 5 depicts an illustrative embodiment of a non-contact capacitive displacement measurement gage 500, in accordance with the present invention. In the illustrated embodiment, the capacitive displacement gage 500 includes a signal generator 510, first and second amplifiers 540–541, and a capacitive probe 504 including a sensor electrode 507, a compensating electrode 530, and a guard electrode 531. The probe 504 is configurable to drive substantially zero current into a target element 506.

As shown in FIG. 5, the target element 506 is connected to the signal generator 510 through an electrical connection 508. For example, the target element 506 may comprise a foil, a semiconductor wafer, or any other suitable target element. In the illustrated embodiment, the electrical connection 508 has an unknown or uncontrollable impedance $Z_2$, and therefore the target element 506 is poorly-connected to the signal generator 510. Nevertheless, because the probe 504 drives substantially zero current into the target element 506, the capacitive displacement gage 500 allows the relationship between the probe/target capacitance and the displacement of the target element 506 to be precisely determined.

As described above, the total current $I_t$ driven into a target element by a capacitive probe consisting of a guard electrode and a sensor electrode is expressed in equation (4) as $$I_t = sV_g\delta_0A_g/d_g + sV_s\delta_0A_s/d_s,$$

in which "$d_g$" is the distance from the guard electrode to the target element, and "$d_s$" is the distance from the sensor electrode to the target element. To assure that a capacitive probe (e.g., the probe 504) drives substantially zero current into a target element (e.g., the target element 506), a compensating factor "$sV_c\delta_0A_c/d_c$" may be added to equation (4) so that $$I_t = sV_g\delta_0A_g/d_g + sV_s\delta_0A_s/d_s + sV_c\delta_0A_c/d_c = 0, \quad (5)$$

in which "$V_c$" is the compensating voltage, "$A_c$" is the area of a compensating electrode (e.g., the compensating electrode 530), and "$d_c$" is the distance from the compensating electrode to the target element. Because the addition of the compensating factor causes the total current $I_t$ to equal zero, as indicated in equation (5), the capacitive probe 504 including the compensating electrode 530 can be configured so that it drives substantially zero current into the target element 506.

Specifically, the signal generator 510 provides a predetermined voltage signal to the sensor electrode 507. Further, the first amplifier 540 provides this predetermined voltage signal to the compensating electrode 530, and the second amplifier 541 configured as a unity-gain buffer provides this signal to the guard electrode 531. As illustrated in FIG. 5, the amplifier 540 has a transfer function "T", which is selected so that the amplifier 540 provides the desired compensating voltage $V_c$ to the compensating electrode 530, thereby assuring that equation (5) holds. Substantially zero current therefore flows through the electrical connection 508, and the effect of the impedance $Z_2$ on the performance of the capacitive displacement gage 500 is essentially nil. Accordingly, because the effect of the impedance $Z_2$ is nullified, the relationship between the probe/target capacitance and the displacement of the target element 506 can subsequently be precisely determined by any suitable technique.

Figure 6:
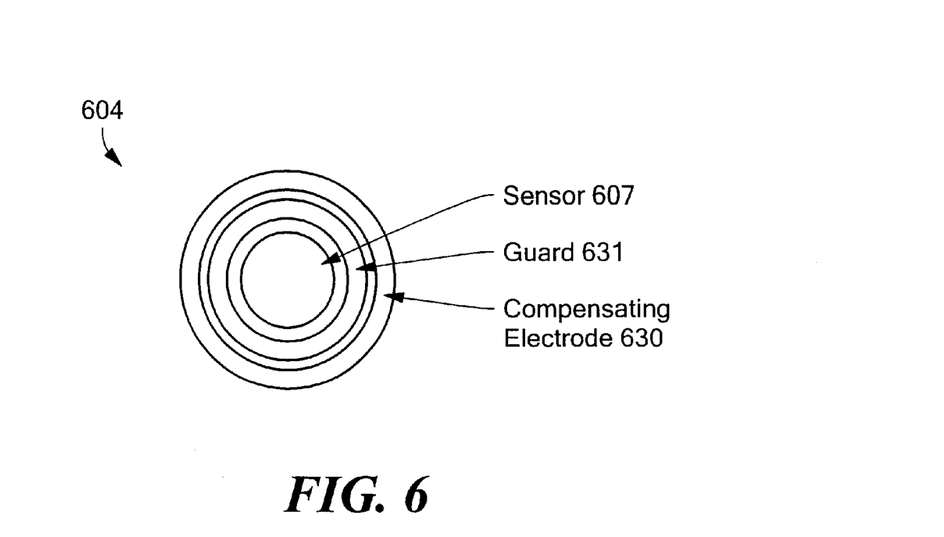
FIG. 6 is a plan view of a capacitive probe included in the capacitive displacement gage of FIG. 5.

FIG. 6 depicts an illustrative embodiment of a capacitive probe 604, which may be included in the capacitive displacement gage 500 (see FIG. 5). As shown in FIG. 6, the capacitive probe 604 includes a sensor electrode 607, a drive electrode 631 configured as a guard electrode, and a compensating electrode 630. The sensor electrode 607 is configured to develop an output signal for measuring the displacement of the target element 506 (see FIG. 5), and the guard electrode 631 is driven at substantially the same voltage as the sensor electrode 607. The compensating electrode 630 is driven at the desired compensating voltage $V_c$. It is appreciated that the sensor electrode 607, the guard electrode 631, and the compensating electrode 630 may have a substantially circular shape, as depicted in FIG. 6, or any other suitable geometric shape.

In the preferred embodiment, $$d_s = d_g = d_c, \quad (6)$$

for all suitable values of $d_s$ (see also equation (5)). For example, the condition illustrated in equation (6) may be met when the sensor electrode 607, the guard electrode 631, and the compensating electrode 630 of the capacitive probe 604 are co-planar. It is understood, however, that partial probe compensation may be achieved if equation (6) does not strictly hold and/or the amplifier 540 (see FIG. 5) does not exactly provide the desired compensating voltage $V_c$ to the compensating electrode. It is further understood that, in alternative embodiments, the probe 604 may include one or more driven and/or grounded electrodes in addition to the sensor electrode 607, the guard electrode 631, and the compensating electrode 630. The probe 604 is depicted in FIG. 6 as including the sensor electrode 607, the guard electrode 631, and the compensating electrode 630 for clarity of illustration.

It will further be appreciated by those of ordinary skill in the art that modifications to and variations of the above-described method for high-accuracy non-contact capacitive displacement measurement of poorly connected targets may be made without departing from the inventive concepts disclosed herein. Accordingly, the invention should not be viewed as limited except as by the scope and spirit of the appended claims.

What is claimed is:

1. A capacitive displacement measurement system, comprising:
    at least one capacitive probe including a sensor electrode, the capacitive probe being configured to detect a capacitance between the probe and a target element, the detected capacitance corresponding to a displacement of the target element;
    a first excitation signal generator configured to provide a first excitation signal to the sensor electrode, the sensor electrode producing a first drive signal in response to the first excitation signal; and
    a compensating subsystem including a second excitation signal generator and a compensating electrode,
    wherein the second excitation signal generator is configured to provide a second excitation signal to the compensating electrode, the compensating electrode producing a second drive signal in response to the second excitation signal, and
    wherein the second drive signal produced by the compensating electrode is operative to compensate for the first drive signal produced by the sensor electrode to assure that substantially zero current is driven into the target element.

2. The system of claim 1 wherein the capacitive probe further includes a guard electrode, the first excitation signal generator being further configured to provide the first excitation signal to the guard electrode.

3. The system of claim 1 wherein the compensating electrode comprises part of the capacitive probe.

4. The system of claim 1 wherein the second excitation signal generator comprises an amplifier having a predetermined transfer function.

5. The system of claim 4 wherein the first excitation signal generator is further configured to provide the first excitation signal to the amplifier, the amplifier being configured to produce the second excitation signal in response to the first excitation signal.

6. The system of claim 1 wherein the capacitive probe further includes the compensating electrode and a guard electrode.

7. The system of claim 6 wherein the sensor electrode is a first predetermined distance from the target element, and the compensating electrode is a second predetermined distance from the target element, the first predetermined distance being equal to the second predetermined distance.

8. The system of claim 7 wherein the sensor electrode and the compensating electrode are substantially coplanar.

9. The system of claim 6 wherein the sensor electrode and the compensating electrode comprise substantially concentric circular elements.

10. The system of claim 1 wherein the compensating subsystem includes an amplifier having a predetermined transfer function and the compensating electrode coupled to an output of the amplifier, wherein the capacitive probe includes the sensor electrode and the compensating electrode, and wherein the first excitation signal generator is configured to provide the first excitation signal to the sensor electrode to produce the first drive signal, and to an input of the amplifier to provide the second excitation signal to the compensating electrode, thereby producing the second drive signal via the compensating electrode.

11. The system of claim 10 wherein the capacitive probe further includes a guard electrode, and wherein the first excitation signal generator is further configured to provide the first excitation signal to the guard electrode to produce a third drive signal.

12. The system of claim 11 wherein the second drive signal produced via the compensating electrode compensates for the first drive signal and the third drive signal produced via the sensor electrode and via the guard electrode, respectively, thereby assuring that substantially zero current is driven into the target element.

13. The system of claim 11 further including a unity gain amplifier coupled between the first excitation signal generator and the guard electrode.

14. The system of claim 11 wherein the sensor electrode, the guard electrode, and the compensating electrode are each a predetermined distance from the target element.

15. The system of claim 14 wherein the sensor electrode, the guard electrode, and the compensating electrode are substantially coplanar.

16. The system of claim 11 wherein the sensor electrode, the guard electrode, and the compensating electrode comprise substantially concentric circular elements.

17. A method of operating a capacitive displacement measurement system, comprising the steps of:
    providing a first excitation signal to at least one capacitive probe by a first excitation signal generator, the capacitive probe including a sensor electrode;
    producing a first drive signal in response to the first excitation signal by the sensor electrode;
    detecting a capacitance between the capacitive probe and a target element by the capacitive probe, the detected capacitance corresponding to a displacement of the target element;
    producing a second drive signal by a compensating subsystem, the compensating subsystem including a second excitation signal generator and a compensating electrode, wherein the second producing step includes providing a second excitation signal to the compensating electrode by the second excitation signal generator, and producing the second drive signal in response to the second excitation signal by the compensating electrode, and compensating for the first drive signal produced by the sensor electrode by the second drive signal produced by the compensating electrode to assure that substantially zero current is driven into the target element.

18. The method of claim 17 wherein the providing step includes providing the first excitation signal to a guard electrode included in the capacitive probe.

19. The method of claim 17 wherein the second producing step includes providing the second excitation signal to the compensating electrode by the second excitation signal generator, the compensating electrode and the second excitation signal generator being included in the compensating subsystem, the compensating electrode being part of the capacitive probe.

20. The method of claim 17 wherein the second producing step includes providing the second excitation signal to the compensating electrode by the second excitation signal generator, the second excitation signal generator comprising an amplifier having a predetermined transfer function.

21. The method of claim 20 wherein the first providing step includes providing the first excitation signal to the amplifier.

22. The method of claim 21 further including the step of producing the second excitation signal in response to the first excitation signal by the amplifier.

23. The method of claim 17 wherein the providing step includes providing the first excitation signal to the capacitive probe by the first excitation signal generator, the capacitive probe including the sensor electrode and the compensating electrode, and a guard electrode.

24. The method of claim 23 wherein the providing step includes providing the first excitation signal to the capacitive probe by the first excitation signal generator, wherein the sensor electrode is a first predetermined distance from the target element, the compensating electrode is a second predetermined distance from the target element, and the first predetermined distance is equal to the second predetermined distance.

25. The method of claim 24 wherein the providing step includes providing the first excitation signal to the capacitive probe by the first excitation signal generator, and wherein the sensor electrode and the compensating electrode are substantially coplanar.

26. The method of claim 24 wherein the providing step includes providing the first excitation signal to the capacitive probe by the first excitation signal generator, and wherein the sensor electrode and the compensating electrode comprise substantially concentric circular elements.

27. The method of claim 11 wherein the providing step includes providing the first excitation signal to the sensor electrode to produce the first drive signal, and to an input of an amplifier to provide the second excitation signal to the compensating electrode, thereby producing the second drive signal via the compensating electrode, wherein the amplifier has a predetermined transfer function, wherein the compensating electrode is coupled to an output of the amplifier, wherein the amplifier and the compensating electrode are included in the compensating subsystem, and wherein the sensor electrode and the compensating electrode are parts of the capacitive probe.

28. The method of claim 27 wherein the providing step further includes providing the first excitation signal to a guard electrode to produce a third drive signal, the guard electrode being part of the capacitive probe.

29. The method of claim 28 wherein the compensating step includes using the second drive signal produced by the compensating electrode to compensate for the first drive signal and the third drive signal produced via the sensor electrode and via the guard electrode, respectively, thereby assuring that substantially zero current is driven into the target element.

* * * * *

UNITED STATES PATENT AND TRADEMARK OFFICE
CERTIFICATE OF CORRECTION

PATENT NO. : 6,714,023 B2
DATED : March 30, 2004
INVENTOR(S) : Roy E. Mallory

It is certified that error appears in the above-identified patent and that said Letters Patent is hereby corrected as shown below:

Column 5,
Line 44, equation (3), "$C=\delta_0 A/d$," should read -- $C=\varepsilon_0 A/d$, --;
Line 45, " "$\delta_0$" " should read -- $\varepsilon_0$ --;
Line 53, equation (4), "$I_t = sV_g\delta_0 A_g/d_g + sV_s\delta_0 A_s/d_s$," should read
-- $I_t = sV_g\varepsilon_0 A_g/d_g + sV_s\varepsilon_0 A_s/d_s$, --;

Column 6,
Line 22, "$I_t = sV_g\delta_0 A_g/d_g + sV_s\delta_0 A_s/d_s$," should read
-- $I_t = sV_g\varepsilon_0 A_g/d_g + sV_s\varepsilon_0 A_s/d_s$, --;
Line 29, " "$sV_c\delta_0 A_c/d_c$" " should read -- "$sV_c\varepsilon_0 A_c/d_c$" --;
Line 32, equation (5) reads:
"$I_t = sV_g\delta_0 A_g/d_g + sV_s\delta_0 A_s/d_s + sV_c\delta_0 A_c/d_c = 0$" should read
-- $I_t = sV_g\varepsilon_0 A_g/d_g + sV_s\varepsilon_0 A_s/d_s + sV_c\varepsilon_0 A_c/d_c = 0$ --; and Column 10,
Line 15, "11" should read -- 17 --.

Signed and Sealed this

Ninth Day of November, 2004

JON W. DUDAS
*Director of the United States Patent and Trademark Office*